United States Patent [19]
Nemoto et al.

[11] Patent Number: 6,008,963
[45] Date of Patent: Dec. 28, 1999

[54] MAGNETIC RECORDING HAVING A SLIDABLE CHASSIS

[75] Inventors: Yasuhiro Nemoto; Kazuo Sakai, both of Ibaraki-ken; Yoshiyuki Tanaka, Katsuta; Kyuichiro Nagai, Fujisawa, all of Japan

[73] Assignee: Hitachi Ltd., Tokyo, Japan

[21] Appl. No.: 08/073,416

[22] Filed: Jun. 9, 1993

[30] Foreign Application Priority Data

Jun. 15, 1992 [JP] Japan .................................... 4-154729

[51] Int. Cl.$^6$ ................................................. G11B 33/00
[52] U.S. Cl. ............................................................ 360/85
[58] Field of Search .................................. 360/85, 84, 95

[56] References Cited

U.S. PATENT DOCUMENTS

| | | | |
|---|---|---|---|
| 4,748,521 | 5/1988 | Osawa et al. | 360/85 |
| 5,025,332 | 6/1991 | Tsuchida et al. | 360/95 |
| 5,153,790 | 10/1992 | Kobayashi et al. | 360/95 |

*Primary Examiner*—William R. Korzuch
*Attorney, Agent, or Firm*—Antonelli, Terry, Stout & Kraus, LLP

[57] ABSTRACT

A magnetic recorder in which magnetic signals are transmitted between a magnetic head device and a magnetic tape, comprises a capstan shaft for driving the magnetic tape when the magnetic tape is pressed against the capstan shaft, so that the magnetic tape runs on the magnetic head device. A pinch roller presses the magnetic tape against the capstan shaft. A main chassis has the magnetic head and the capstan shaft mounted thereon. The magnetic tape and the pinch roller are mounted on a side chassis, with the slide chassis being movable relatively to the main chassis in a feed path between a first position in which the magnetic tape is wound on the magnetic head device for transmitting the magnetic signals therebetween, and a second position in which the magnetic tape is separated apart from the magnetic head device. A positioning arrangement is connected to both of the main chassis and the slide chassis to restrain a change in positional relation between the main chassis and the slide chassis in at least one direction when the magnetic tape is pressed against the capstan shaft by the pinch roller, and is separated from at least one of the main chassis and the slide chassis in the at least one direction in at least a part of the feed path when the magnetic tape is prevented from being pressed against the capstan shaft by the pinch roller.

18 Claims, 7 Drawing Sheets

TAPE WIDTH DIRECTION ic recording

MAGNETIC RECORDING HAVING A SLIDABLE CHASSIS

BACKGROUND OF THE INVENTION AND RELATED ART STATEMENT

The present invention relates to a magnetic recorder, in which a magnetic head and a capstan shaft are mounted on a main chassis, and a magnetic tape and a pinch roller are mounted on a slide chassis movable on the main chassis.

In a conventional magnetic recorder as disclosed in Publication of Japanese Unexamined Patent Application No. 61-271648 or No. 63-302458, a slide chassis with a tape cassette thereon is movable relative to a rotary drum with a magnetic head thereon so that a magnetic tape is wound onto the rotary drum in an opening of the tape cassette to transmit magnetic signals between the magnetic tape and the magnetic head. The slide chassis is supported on the main chassis by three or four boss supports in a movable manner with keeping a distance therebetween constant.

OBJECT AND SUMMARY OF THE INVENTION

An object of the present invention is to provide a magnetic recorder in which a force for driving a slide chassis is small, and a magnetic tape on the slide chassis is correctly positioned relative to a magnetic head when magnetic signals are transmitted therebetween.

According to the present invention, a magnetic recorder in which magnetic signals are transmitted between a magnetic head and a magnetic tape comprises a capstan shaft for driving the magnetic tape when the magnetic tape is pressed against the capstan shaft, so that the magnetic tape runs on the magnetic head, with a pinch roller pressing the magnetic tape against the capstan shaft, and a main chassis on which the magnetic head and the capstan shaft are mounted. The magnetic tape and the pinch roller are mounted on the slide chassis with the slide chassis being movable within a feed range between a first position in which the magnetic tape is wound on the magnetic head for transmitting the magnetic signals therebetween, and the second position in which the magnetic tape is separated from the magnetic head. A positioning means is connected to both the main chassis and the slide chassis to retrain a change in positional relationship between the main chassis and the slide chassis in at least one direction when the magnetic tape is pressed against the capstan shaft, and the positioning means is separated from at least one of the main chassis and the slide chassis in the at least one direction in at least a part of the feed range when the magnetic tape is prevented from being pressed against the capstan shaft.

In the present invention, since the positioning means is connected to both of the main chassis and the slide chassis to restrain the change in positional relationship between the main chassis and the slide chassis when the magnetic tape is pressed against the capstan shaft, and is separated from at least one of the main chassis and the slide chassis in at least one direction in at least the part of the feed range when the magnetic tape is prevented from being pressed against the capstan shaft. A positional relationship between the magnetic head and the magnetic tape is correctly maintained without being deteriorated by the change in the positional relationship between the main chassis and the slide chassis when the magnetic tape runs on the magnetic head, and a movement of the slide chassis on the main chassis is smooth without being restrained by the positioning means in the part of the feed range when the magnetic tape is prevented from being pressed against the capstan shaft and the magnetic tape does not run on the magnetic head.

DETAILED DESCRIPTION OF THE PREFERRED EMBODIMENTS

Figure 1:
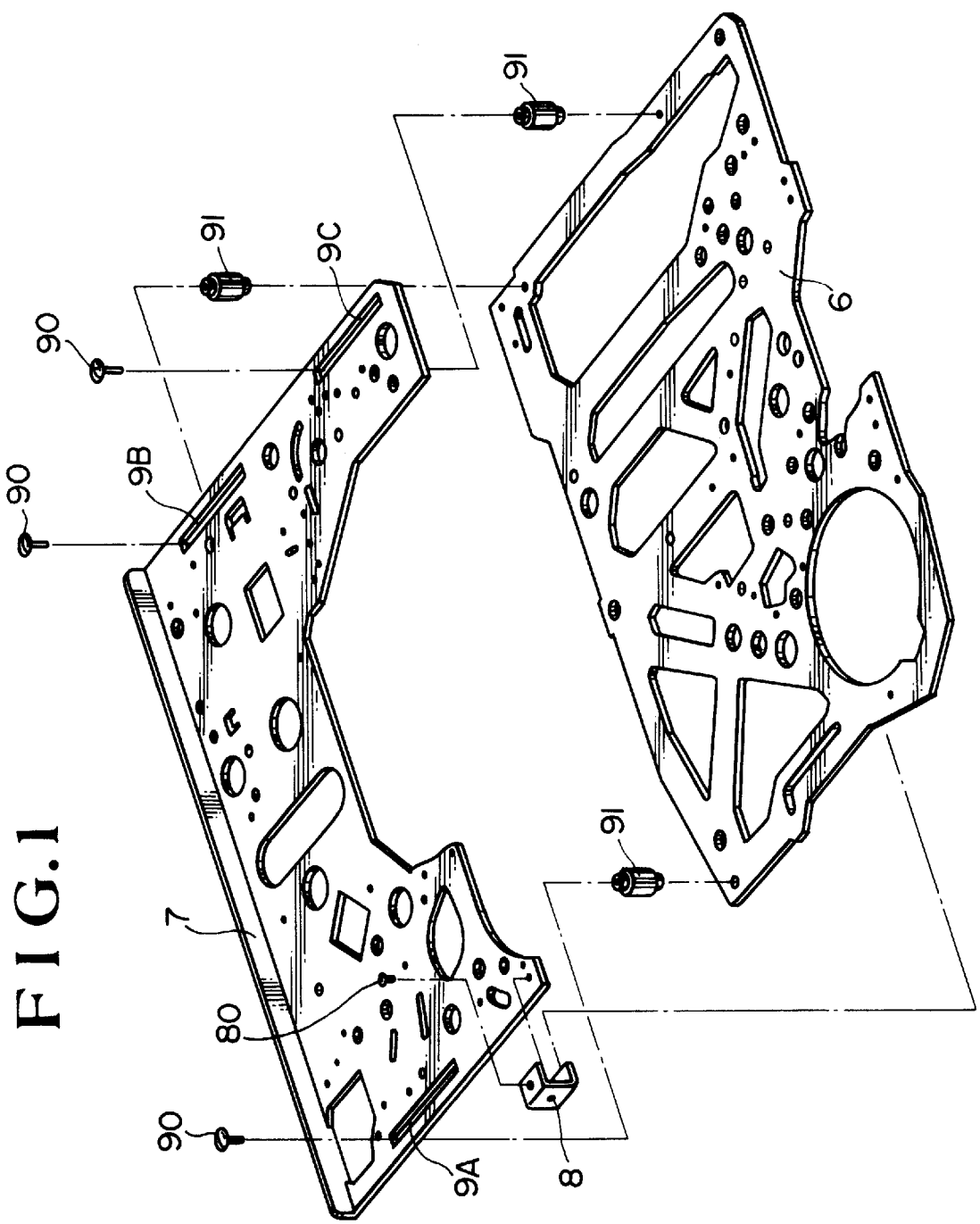
FIG. 1 is an oblique perspective view of a main chassis and a slide chassis used in a first embodiment mechanism of the present invention.
Figure 2:
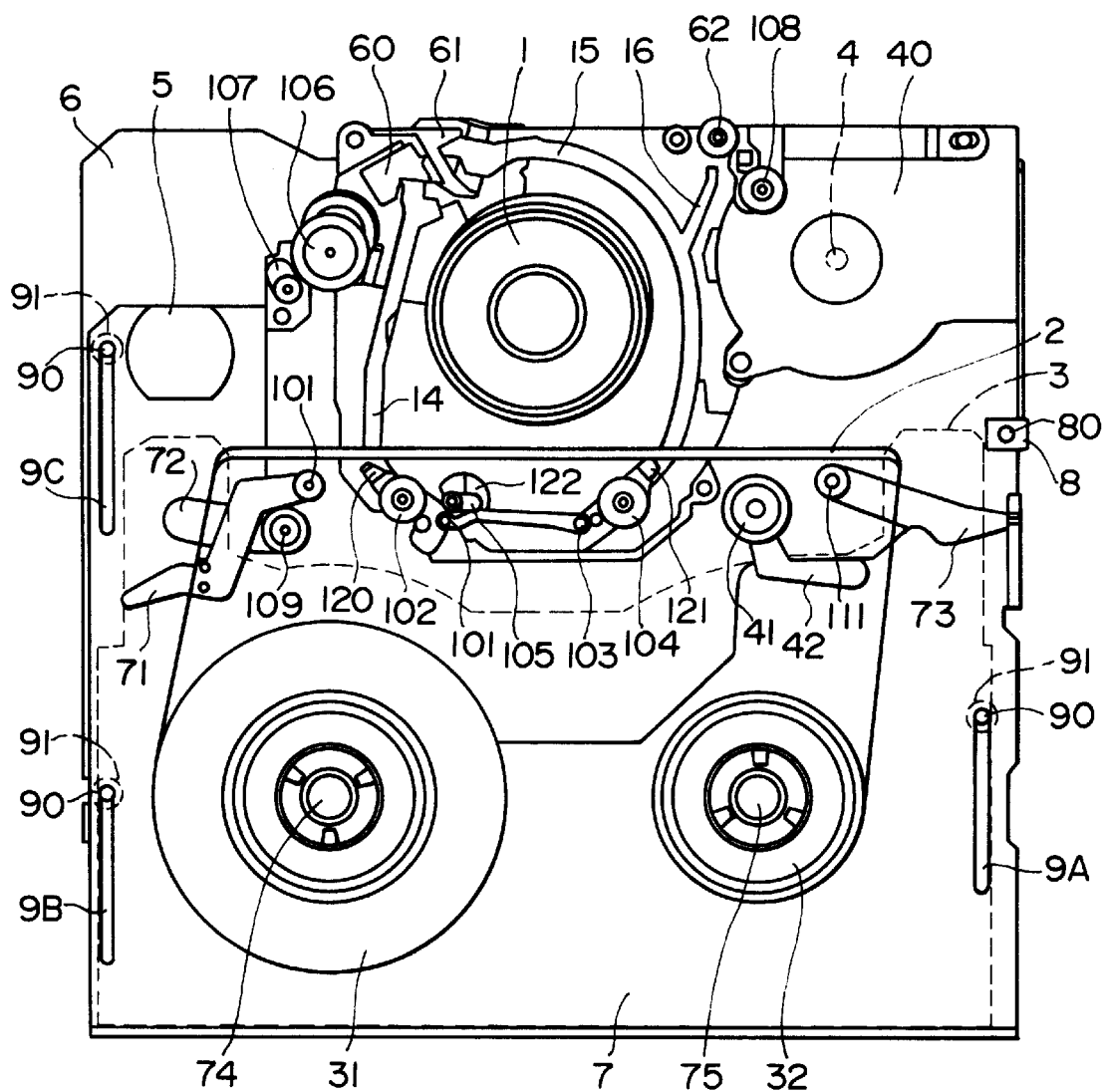
FIG. 2 is an upper plane view showing the mechanism in a condition that a tape cassette has been mounted on the mechanism and a magnetic tape is separated apart from a magnetic head device at a second position of the slide chassis.
Figure 3:
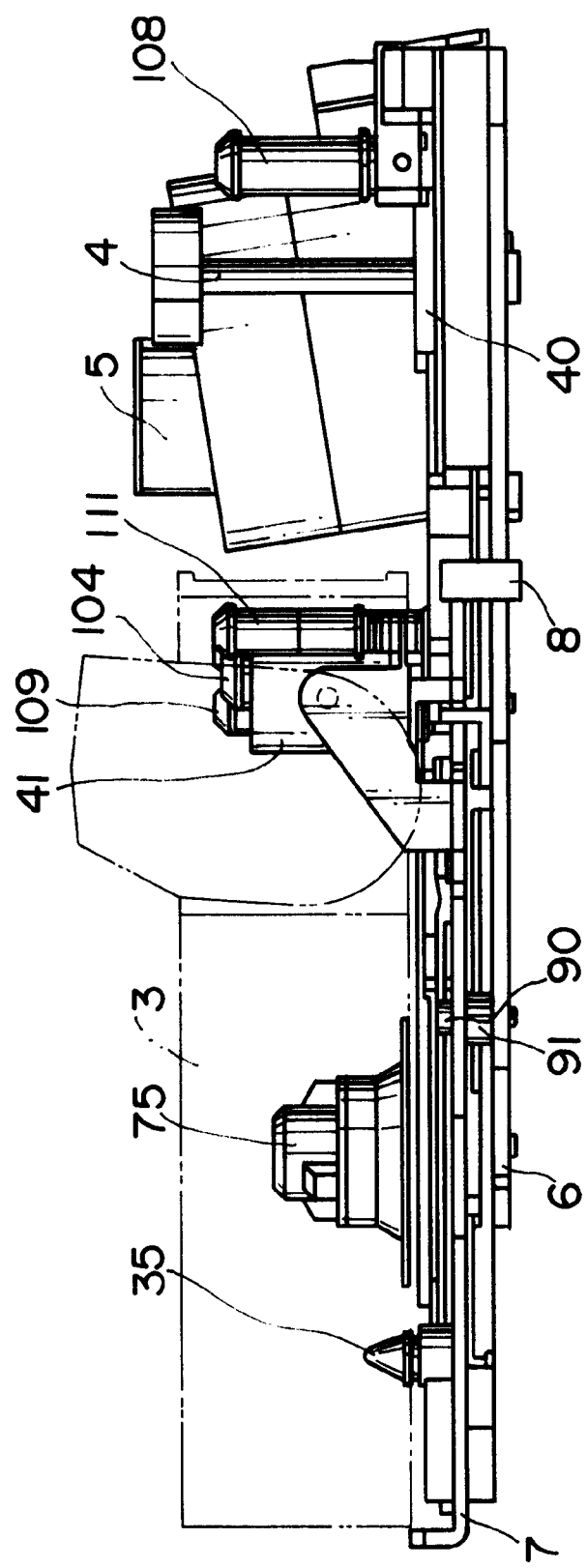
FIG. 3 is a side plane view showing the mechanism in the condition that the tape cassette has been mounted on the mechanism at the second position.

As shown in FIG. 1, each of a main chassis 6 and a slide chassis 7 has many through-holes to decrease a weight thereof. A through-hole area rate of the main chassis 6 is about 47%, and that of the slide chassis 7 is about 23%. On the other hand, that of a conventional chassis is about 15%. The through-hole area rate is a percentage of a through-hole cross-sectional area relative to an upper surface area of chassis before the through-holes are formed therein. A stiffness of each of the main chassis 6 and the slide chassis 7 against a bending moment is decreased by about 40% in comparison with that of the conventional chassis. Therefore, a deformation of each of the main chassis 6 and the slide chassis 7 or a change in the positional relationship between the main chassis 6 and the slide chassis 7 needs to be restrained.

A magnetic head (not shown) is mounted in a rotary drum 1 to transmit magnetic signals between a magnetic tape 2 and the magnetic head. A rotational axis of the rotary drum 1 is inclined relatively to a direction perpendicular to an imaginary plane including a longitudinal direction of the magnetic tape 2 by a predetermined angle. The predetermined angle of about 3–10 degrees is suitable for arranging a cassette 3 receiving the magnetic tape 2 as close as possible to the rotary drum 1 and for reading and writing the magnetic pattern on the tape with an accuracy necessary for a predetermined recording format.

The magnetic tape 2 is wound around reels 31 and 32 in the cassette 3 positioned by contact pins 35 on the slide chassis 7. The reels 31 and 32 are driven respectively through reel hubs 74, 75 supported on the slide chassis 7. A part of the tape 2 is withdrawn out of the cassette 3 to be wound obliquely on the rotary drum 1 by withdrawing members 101–105 mounted respectively on moving members 120–122 and by withdrawing members 109–111 driven by rotational supporting members 71–73. On each of feed paths 14–16 for controlling an attitude and position of each of the withdrawing members 101–105 and 109–111, the tape 2 is prevented from being damaged on flanges of the withdrawing members 101–105 and 109–111, when a contact and winding of the tape 2 onto the rotary drum 1 proceeds.

The slide chassis 7 is driven by a loading motor 5 to move relatively to the rotary drum 1 in a feed path of the slide chassis 7 extending substantially perpendicularly to a width direction of the tape 2. Three boss members 91 are fixed onto the main chassis 6. Slide grooves 9A–9C of the slide chassis 7 extending in a direction parallel to the feed path of the slide chassis 7 respectively receive the boss members 91 with respective clearances therebetween in a direction substantially perpendicular to the width direction of the tape 2 and to the feed path of the slide chassis 7, and flange screws 90 fixed onto ends of the boss members 91 limit a movement of the slide chassis 7 with respective clearances therebetween in the width direction of the tape 2, so that the slide chassis 7 is guided in a smoothly movable manner by the boss members 91 and the flange screws 90 along the feed path of the slide chassis 7. The clearances between the slide chassis 7 and the slide grooves 9A–9C and between the slide chassis 7 and the boss members 91 or the flange screws 90 deteriorate an accuracy of positional relation between the slide chassis 7 and the main chassis 6.

Figure 4:
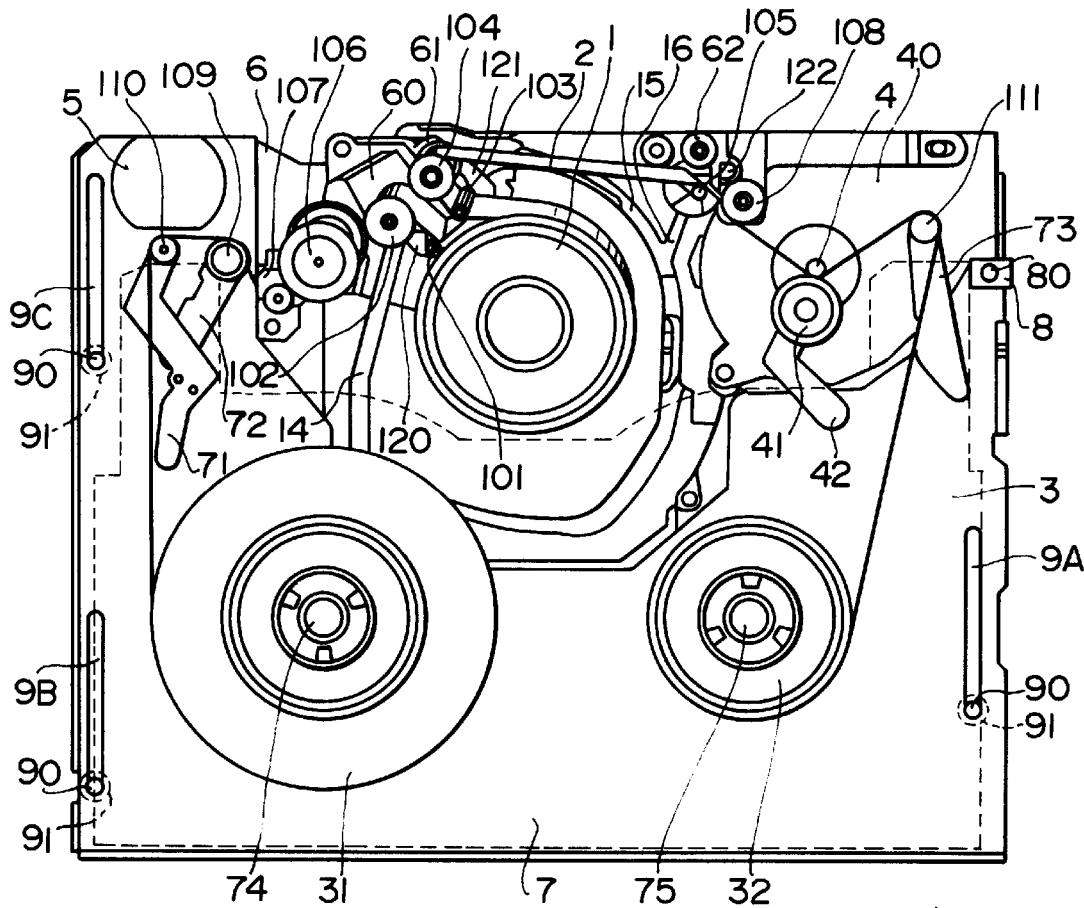
FIG. 4 is an upper plane view showing the mechanism in a condition that the slide chassis is at a first position for transmitting magnetic signals between a magnetic head and a magnetic tape.
Figure 5:
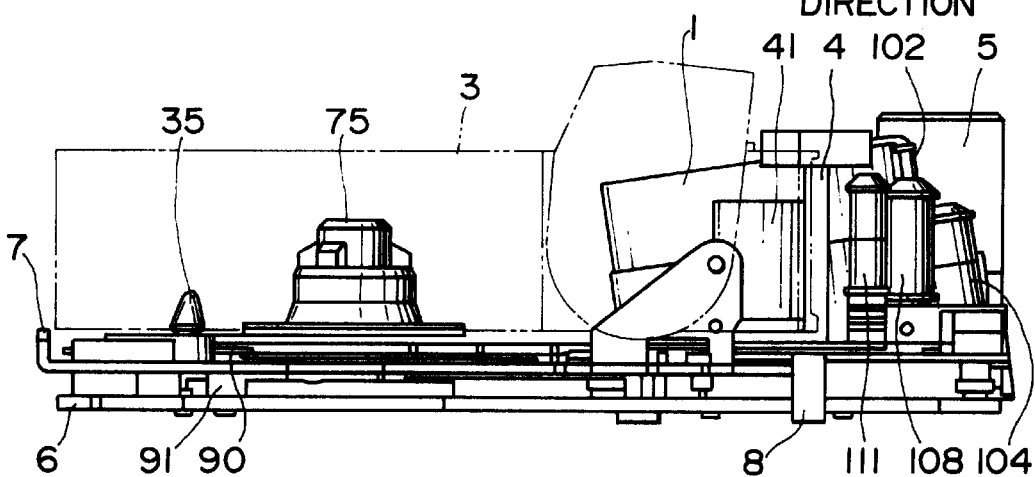
FIG. 5 is a side plane view showing the mechanism in the condition that the slide chassis is at the first position.

A positioning member 8 fixed onto the slide chassis 7 by a screw 80 is connected to the main chassis 6 in the vicinity of a capstan mounting portion 43 to limit a separation between the main chassis 6 and the slide chassis 7 in the width direction of the tape 2 and/or another direction substantially perpendicular to the feed path direction when a pinch roller 41 presses the tape 2 against a capstan shaft 4 to feed the tape 2 for a magnetic head device formed by the rotary drum 1 and the magnetic head therein after the slide chassis 7 reaches a first position thereof, that is, an end of the feed path of the slide chassis 7 where the magnetic signals are transmitted between the tape and the magnetic head device. The positioning member 8 is separated from the main chassis 6 before the pinch roller 41 presses the tape 2 against the capstan shaft 4, even when the slide chassis 7 reaches the first position. As shown in FIGS. 4 and 5, when the magnetic signals are transmitted between the tape 2 and the magnetic head device, the withdrawing members 101–105 are pressed against respective contact members 60–62 to be positioned at ends of the feed paths 14–16 so that the tape 2 is wound onto the rotation drum 1. The tape 2 is also wound by respective predetermined angles onto the withdrawing members 109–111, inclined guide rollers 106 and 107, the withdrawing members 101–105, a tape guide 108 and the capstan shaft 4 driven by a capstan motor 40, so that the tape 2 is pressed securely against the capstan shaft 4 by the pinch roller 41 and is fed to a desired position on the rotary drum 1. A pressing force of the pinch roller 41 against the capstan shaft 4 is generated by a coil spring or a plate spring and transmitted through a pinch roller arm 42 or the like.

Figure 6:
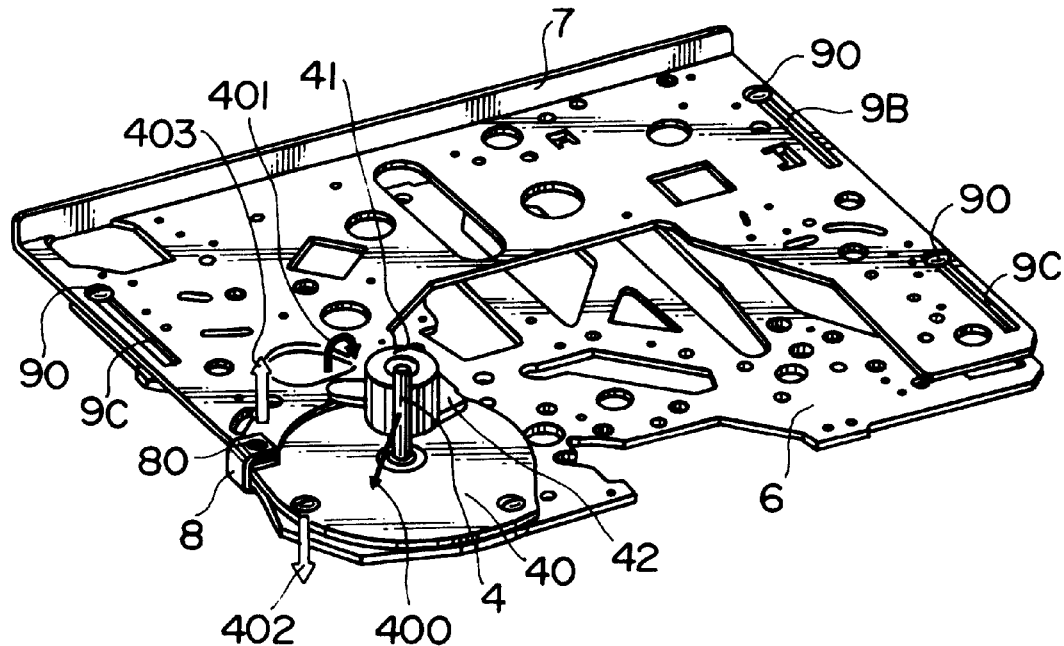
FIG. 6 is an oblique perspective view showing the mechanism in which a positioning member restrains a change in positional relationship between the main chassis and the slide chassis.

As shown in FIG. 6, the pressing force 400 of the pinch roller 41 against the capstan shaft 4 moves and/or deforms in the direction of the arrow 401 representing a bending moment, the main chassis 6 and/or the slide chassis 7 to increase a distance between the main chassis 6 and the slide chassis 7 in the width direction of the tape 2 and/or another direction substantially perpendicular to the feed path direction, as shown by arrows 402 and 403 respectively. The increase in distance between the main chassis 6 and the slide chassis 7 causes the connection or contact between the main chassis 6 and the slide chassis 7 through the positioning member 8, so that the positioning member 8 fixed onto the slide chassis 7 is connected to the main chassis 9 to prevent the distance between the main chassis 6 and the slide chassis 7 from increasing further. In this embodiment, the positioning member 8 is not connected to the main chassis 9, when the pressing force 400 is not generated, that is, at least before the slide chassis 7 reaches the first position thereof. Therefore, the positioning member 8 does not effect or restrain the movement of the slide chassis 7 in at least a part of the feed path of the slide chassis 7 from the second position to the first position. A plurality of the positioning members 8 may be arranged between the main chassis 6 and the slide chassis 7.

Alternatively, the pinch roller 41 may press the tape 2 against the capstan shaft 4 to cause the connection or contact between the main chassis 6 and the slide chassis 7 through the positioning member 8, before the slide chassis 7 reaches the first position, that is, in a limited partial range of the feed path of the slide chassis 7 in the vicinity of the first position.

Figure 7:
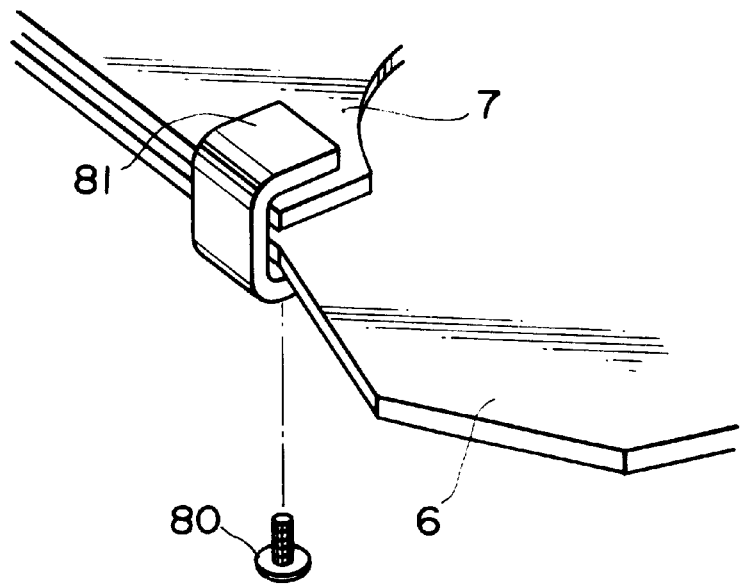
FIG. 7 is an oblique perspective view showing another positioning member used in a second embodiment mechanism of the present invention.
Figure 8:
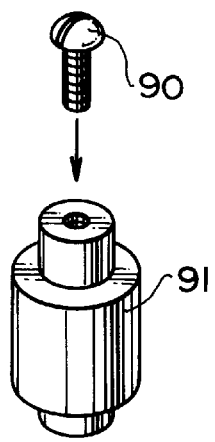
FIG. 8 is an oblique exploded perspective view showing in detail a member for guiding the slide chassis on the main chassis.
Figure 9:
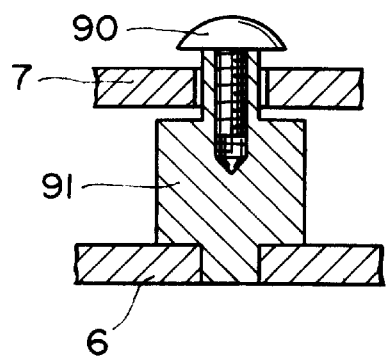
FIG. 9 is a cross-sectional view showing a guidance of the slide chassis on the main chassis.

As shown in FIG. 7, a positioning member 81 as a substitute of the positioning member 8 may be fixed to the main chassis 6 by the screw 80. The positioning member 81 restrains or limits the increase in distance between the main chassis 6 and the slide chassis 7 in substantially the same manner as the positioning member 8.

Figure 10:
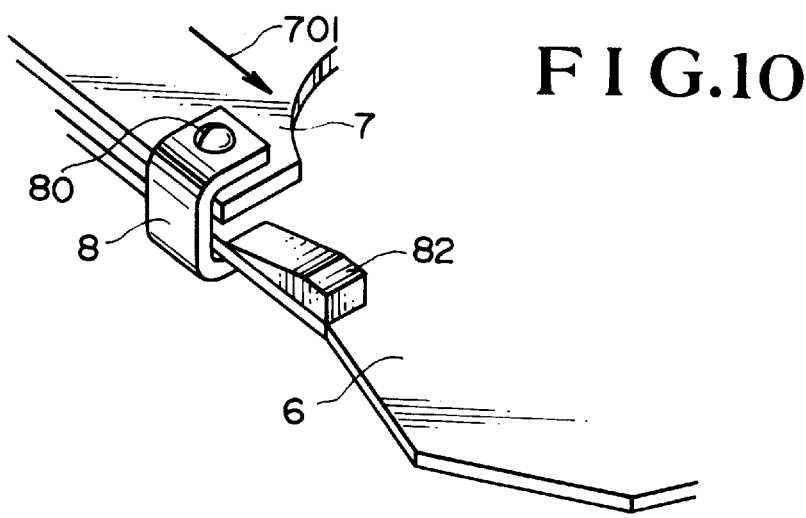
FIG. 10 is an oblique perspective view showing a positioning assistance member for restraining the change in positional relation between the main chassis and the slide chassis according to a movement of the slide chassis toward the first position before a pinch roller presses the magnetic tape against a capstan shaft.
Figure 11:
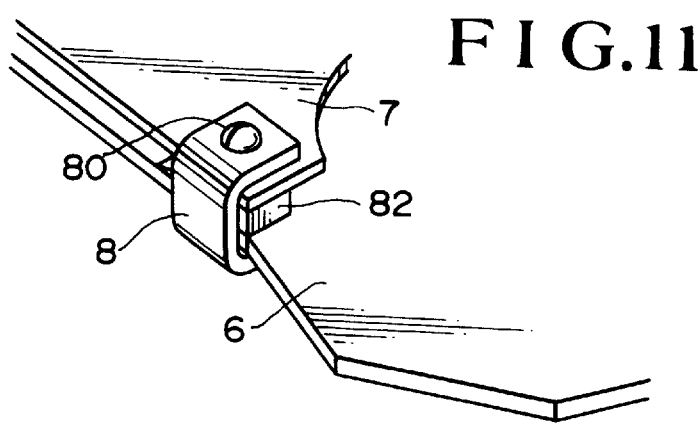
FIG. 11 is an oblique perspective view showing a part of the mechanism of FIG. 10 after the slide chassis reaches the first position.

As shown in FIGS. 10 and 11, a positioning assistance member 82 may be arranged on the main chassis 6 to cooperate with the positioning member 8 in a vicinity of the first position. The positioning assistance member 82 has a taper surface which contacts with the slide chassis 7 to gradually increase the distance between the main chassis 6 and the slide chassis 7. After the increase in distance between the main chassis 6 and the slide chassis 7 reaches a predetermined degree on the movement of the slide chassis in the feed path thereof along a slide direction as shown by an arrow 701, the distance between the main chassis 6 and the slide chassis 7 is further increased by the pressing force 400 of the pinch roller 41 against the capstan shaft 4, and the increase in distance therebetween is limited by the positioning member 8. In this embodiment, a change in distance therebetween caused by the pressing force 400 of the pinch roller 41 is small.

Figure 12:
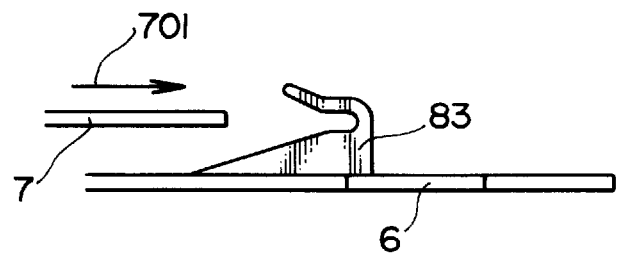
FIG. 12 is an oblique perspective view showing another positioning for restraining the change in positional relation between the main chassis and the slide chassis according to the movement of the slide chassis toward the first position before the pinch roller presses the magnetic tape against the capstan shaft.
Figure 13:
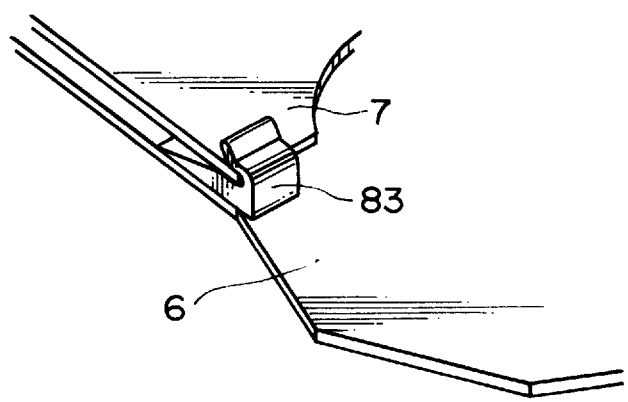
FIG. 13 is an oblique perspective view showing a part of the mechanism of FIG. 12 after the slide chassis reaches the first position.

As shown in FIGS. 12 and 13, a positioning member 83, as a substitute of the positioning member 8, may be fixed to the main chassis 6. The slide chassis 7 fits closely in the positioning member 83 to fix the distance between the main chassis 6 and the slide chassis 7 in a limited partial range of the feed path of the slide chassis 7 in the vicinity of the first position before the pinch roller 41 presses the tape 2 against the capstan shaft 4. The positioning member 83 has a taper surface which contacts with the slide chassis 7 to gradually increase or decrease the distance between the main chassis 6 and the slide chassis 7. After the distance between the main chassis 6 and the slide chassis 7 reaches and is fixed to a predetermined degree on the movement of the slide chassis in the feed path thereof along the slide direction as shown by the arrow 701, the pinch roller 41 presses the tape 2 against the capstan shaft 4. In this embodiment, the change in distance therebetween caused by the pressing force 400 of the pinch roller 41 is substantially zero.

Figure 14:
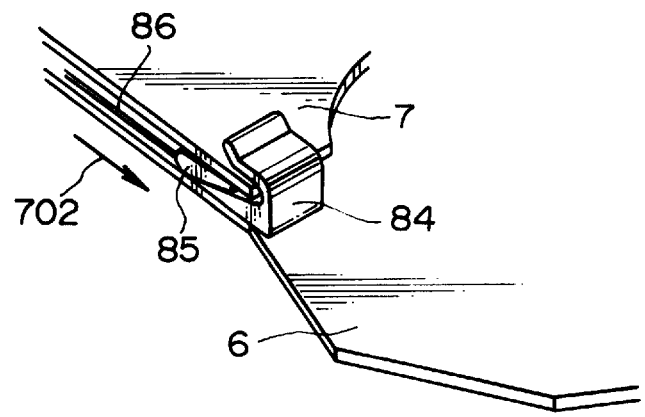
FIG. 14 is an oblique perspective view showing another positioning mechanism, one member of which is driven by an actuator to be connected to the slide chassis and the main chassis to restrain the change in positional relation therebetween before the pinch roller presses the magnetic tape against the capstan shaft after the slide chassis reaches the first position.

As shown in FIG. 14, a combination of a positioning assistance member 85 moved by an actuator lever 86 and a positioning member 84 fixed to the main chassis 6 may be used as a substitute of the positioning member 8. The positioning member 84 has a taper surface which contacts with the slide chassis 7 to gradually increase or decrease the distance between the main chassis 6 and the slide chassis 7. After the distance between the main chassis 6 and the slide chassis 7 is adjusted into a predetermined range thereof on the movement of the slide chassis in the feed path thereof in the vicinity of the first position, the positioning assistance member 85 is moved by the actuator lever 86 in a direction as shown by an arrow 702 to be inserted between the slide chassis 7 and the positioning member 84 so that the distance between the main chassis 6 and the slide chassis 7 is increased or fixed to a predetermined degree. Subsequently, the pinch roller 41 presses the tape 2 against the capstan shaft 4. In this embodiment, the change in distance therebetween caused by the pressing force 400 of the pinch roller 41 is substantially zero. The actuator lever 86 may be driven by a rotational motor, a solenoid, toothed gear or a cam-mechanism. After the pinch roller 41 is prevented from pressing the tape 2 against the capstan shaft 4, the positioning assistance member 85 is moved by the actuator lever 86 in a direction opposite to the direction shown by the arrow 702 to be separated from the positioning member 84. Thereafter, the slide chassis 7 moves backward from the first position.

What is claimed is:

1. A magnetic recorder in which magnetic signals are transmitted between a magnetic head device and a magnetic tape, comprising:
    a capstan shaft for driving the magnetic tape when the magnetic tape is pressed against the capstan shaft, so that the magnetic tape runs on the magnetic head device,
    a pinch roller for pressing the magnetic tape against the capstan shaft,
    a main chassis on which the magnetic head and the capstan shaft are mounted,
    a slide chassis on which the magnetic tape and the pinch roller are mounted, the slide chassis being movable relative to the main chassis in a feed path between a first position in which the magnetic tape is wound on the magnetic head device for transferring the magnetic signals therebetween, and a second position in which the magnetic tape is separated apart from the magnetic head device, and
    positioning means adapted to be connected to both the main chassis and the slide chassis to restrain in positional relationship between the main chassis and the slide chassis in at least one direction when the magnetic tape is pressed against the capstan shaft by the pinch roller, and which is separated from at least one of the main chassis and the slide chassis in the at least one direction at least a part of the feed path when the magnetic tape is prevented from being pressed against the capstan shaft by the pinch roller, and
    wherein the positioning means is connected to both the main chassis and the slide chassis to restrain the change in positional relationship between the main chassis and the slide chassis in the at least one direction when a force of the pinch roller pressing the magnetic tape against the capstan is more than a predetermined degree.

2. A magnetic recorder according to claim 1, wherein the positioning means is connected to both of the main chassis and the slide chassis to restrain the change in positional relation between the main chassis and the slide chassis in the at least one direction when the magnetic tape is pressed against the capstan shaft by the pinch roller and the slide chassis is at the first position.

3. A magnetic recorder according to claim 1, wherein the positioning means is connected to both of the main chassis and the slide chassis to restrain the change in positional relation between the main chassis and the slide chassis in the direction, also when the magnetic tape is prevented from being pressed against the capstan shaft by the pinch roller and the slide chassis is at the first position.

4. A magnetic recorder according to claim 1, wherein the positioning means is separated from the one of the main chassis and the slide chassis in the direction when the magnetic tape is prevented from being pressed against the capstan shaft by the pinch roller and the slide chassis is at the first position.

5. A magnetic recorder according to claim 1, wherein the positioning means is separated from the one of the main chassis and the slide chassis in the direction when the slide chassis is at the second position.

6. A magnetic recorder according to claim 1, wherein the positioning means is separated from the one of the main chassis and the slide chassis in the direction when the slide chassis is moving from the second position toward the first position.

7. A magnetic recorder according to claim 1, wherein the positioning means is connected to both of the main chassis and the slide chassis to restrain the change in positional relation between the main chassis and the slide chassis in the direction before the slide chassis reaches the first position, subsequently, the magnetic tape is pressed against the capstan shaft by the pinch roller.

8. A magnetic recorder according to claim 1, wherein the positioning means is connected to both of the main chassis and the slide chassis to restrain the change in positional relation between the main chassis and the slide chassis in the direction after the slide chassis reaches the first position, subsequently, the magnetic tape is pressed against the capstan shaft by the pinch roller.

9. A magnetic recorder according to claim 1, wherein the positioning means is connected to both of the main chassis and the slide chassis to restrain the change in positional relation between the main chassis and the slide chassis in the direction substantially simultaneously with that the slide chassis reaches the first position, subsequently, the magnetic tape is pressed against the capstan shaft by the pinch roller.

10. A magnetic recorder according to claim 1, wherein the at least one direction is substantially perpendicular to a direction of the feed path.

11. A magnetic recorder according to claim 1, wherein the at least one direction is substantially a width direction of the magnetic tape.

12. A magnetic recorder according to claim 1, wherein the positioning means is separated from the one of the main chassis and the slide chassis in another direction substantially perpendicular to the direction when the positioning means is connected to both of the main chassis and the slide chassis to restrain the change in positional relationship between the main chassis and the slide chassis in the direction.

13. A magnetic recorder according to claim 1, wherein the positioning means is separated from the one of the main chassis and the slide chassis in another direction substantially perpendicular to the direction in the part of the feed path.

14. A magnetic recording according to claim 1, wherein the positioning means is always separated from one of the main chassis and the slide chassis in another direction substantially perpendicular to the at least one direction.

15. A magnetic recorder according to claim 1, wherein the positioning means is connected to both the main chassis and the slide chassis to restrain the change in positional relationship between the main chassis and the slide chassis in the at least one direction in accordance with a movement of the slide chassis relative to the main chassis in the feed path.

16. A magnetic recorder according to claim 1, wherein the positioning means is connected to both the main chassis and the slide chassis to restrain the change in positional relationship between the main chassis and the slide chassis in the at least one direction in accordance with a movement of the slide chassis relative to the main chassis in the at least one direction.

17. A magnetic recorder according to claim 1, wherein the magnetic recorder further comprises an actuator for driving the positioning means to be connected to both the main chassis and the slide chassis to restrain the change in positional relationship between the main chassis and the slide chassis in the at least one direction.

18. A magnetic recording in which magnetic signals are transmitted between a magnetic head and a magnetic tape, comprising:

a capstan shaft for driving the magnetic tape when the magnetic tape is pressed against the capstan shaft, so that the magnetic tape runs on the magnetic head, a pinch roller for pressing the magnetic tape against the capstan shaft, a main chassis on which the magnetic head and the capstan shaft are mounted, a slide chassis on which the magnetic tape and the pinch roller are mounted, the slide chassis being movable relative to the main chassis in a feed path between a first position in which the magnetic tape is wound on the magnetic head device for transmitting the magnetic signals therebetween, and a second position in which the magnetic tape is separated from the magnetic head device, and positioning means adapted to be connected to both the main chassis and the slide chassis to restrain a change in a positional relationship between the main chassis and the slide chassis in at least one direction when the magnetic tape is pressed against the capstan shaft by the pinch roller, and which is separated from at least one of the main chassis and the slide chassis in the at least one direction in at least a part of the feed path when the magnetic tape is prevented from being pressed against the capstan shaft by the pinch roller, and wherein the positioning means is prevented from restraining another change in positional relationship between the main chassis and the slide chassis in both directions opposite to each other along the feed path when the positioning means is connected to both the main chassis and the slide chassis.

* * * * *